July 22, 1969 J. MEULEMAN 3,457,470

RADIATION DETECTORS HAVING A SEMICONDUCTOR BODY

Filed June 29, 1966

INVENTOR.
JOHANNES MEULEMAN
BY Frank R. Trifari
AGENT

United States Patent Office 3,457,470

Patented July 22, 1969

3,457,470

RADIATION DETECTORS HAVING A SEMI-CONDUCTOR BODY

Johannes Meuleman, Caen, Calvados, France, assignor, by mesne assignments, to U.S. Philips Corporation, New York, N.Y., a corporation of Delaware Filed June 29, 1966, Ser. No. 561,523
Claims priority, application France, July 1, 1965, 23,153
Int. Cl. H01l *15/00*
U.S. Cl. 317—234 3 Claims

ABSTRACT OF THE DISCLOSURE

A surface barrier radiation detector employing a stabilizing metal oxide on the superficially oxidized semiconductor surface to stabilize its electrical properties. Palladium oxide and titanium oxide are preferred stabilizing oxides.

This invention relates to radiation detectors having a semiconductor body of one conductivity type which comprises a surface barrier diode of which the inversion layer of the other conductivity type is formed beneath the surface of the semiconductor body directed towards the incident radiation by superficial oxidation, one electrode consisting of a metal layer applied to another surface of the body.

It is known to use a semiconductor diode polarised in the reverse direction for the detection and spectrometry of ionising, undulatery or corpuscular radiation. A depletion region or space charge region thus arises on each side of the junction of the polarised diode. Said region is made conducting upon penetration of an incident ionizing particle and a voltage pulse can be received at the terminals of a resistor in series with the polarisation source of the diode. The received pulses may then be analyzed by suitable electronic devices. Among the various semiconductor diodes so-called surface barrier detectors are very suitable for the detection of particles.

It is also known that for the manufacture of such detectors start is usually made from monocrystalline plates of silicon or germanium of n-type conductivity. To form the rectifying surface, one surface of the plate is superficially oxidized, resulting in a very thin inversion layer of p-type conductivity. Such a layer is spontaneously formed at the surface of any plate of n-type silicon which is exposed to air, if the specific resistance of this plate is higher than 10 ohm cm.

After the plate has been subjected to the mechanical and chemical treatments necessary to obtain, by removal of material, a region which is disturbed as little as possible and subsequently, a surface layer oxidized in the natural way, for example, by action of air, ozone or water, the detection surface of the plate is formed by depositing on the oxidized layer, by evaporation in vacuo, a metal layer, for example of gold, platinum or a similar metal, and providing a contact on this metal layer. During these processes the formation of the inversion layer by oxidation through the metal layer proceeds continuously, the inversion layer at the same time being stabilized by the metal. The surface covered with metal constitutes the surface of incidence of the ionizing radiation and its geometrical shape depends upon the purpose for which the detector is to be used.

A second contact is made in known manner to the n-type conductivity region of the plate.

Subsequently the detector device is mounted in a suitable housing to permit the electrical connection thereof.

Such a device must have at certain number of properties the most important of which are:

(1) The stability with time, which depends upon the physic-chemical stability of the whole;

(2) The degree of resolution, which is correlated not only to the electrical properties (low noise level, low cut-off current), but also to the configuration of the detector diode. In fact, the metal deposit yields a dead region in which incident radiation produces ionization (during which the radiation loses energy) but in which the charge carriers are not collected. This dead region or "input window" results in a loss of energy for the incident radiation which depends upon the thickness of the metal layer deposited on the detector. Consequently the geometrical dimensions of the "input window" act upon the degree of resolution;

(3) The reproducibility of the characteristics of the detector devices.

Experience shows that known devices having a cut-off layer suffer from many disadvantages. The adhesion of the metal layer to the crystal is poor, instable, and this layer tends to deteriorate in time, more particularly in vacuo ($10^{-7}$ to $10^{-9}$ mm. Hg). Consequently the noise factor and the strength of the reverse current of said devices are rather high. Furthermore, known devices cannot be operated in high vacuum since the oxygen ions of the oxide layer slowly diffuse through the metal layer, resulting progressively in deterioration of the diode. Such devices are, however, often used in apparatus for accelerating particles in which a high vacuum prevails.

According to the invention a radiation detector of the kind mentioned in the preamble is characterized in that the inversion layer is covered on its side remote from the semiconductor body with a layer of a stable metal oxide having at least in part covalent bonds between the metal atoms and the oxygen atoms and a stratified crystal structure, a second electrode layer being applied to said layer.

In order that the invention may readily be carried into effect it will now be described in detail, by way of example, with reference to the accompanying drawing, in which.

Figure 1:
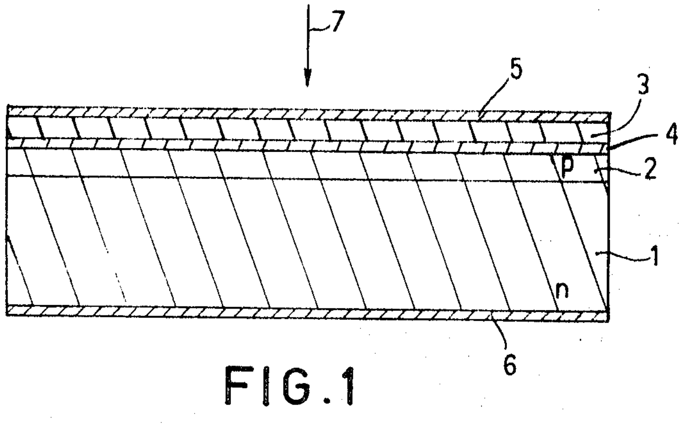
FIG. 1 shows diagrammatically a device according to the invention.

The semiconductor device of FIG. 1 comprises a semiconductor plate 1 of, for example, silicon, usually of the n-type, having an inversion layer 2 of small thickness and of opposite conductivity, i.e. of the p-type, which may be obtained by mere oxidation shown at 4 in FIG. 1, and an oxide layer 3 which is deposited on the oxidized surface 4 over the inversion layer 2 and serves for the stabilization thereof. Electrodes 5 and 6 are applied in a known manner as shown in FIG. 1. The device is positioned so that radiation 7 is incident on the side with the inversion layer 2. The layer thicknesses shown are not to scale.

It is to be noted that the metal oxides selected for the layer 3 must preferably originate from metals which provide oxide series which are stable and not fully ionogenous, but especially covalent. These oxides must have a structure such that the metal atom forms very stable bonds with the oxygen present at the semiconductor surface. This bonding may be facilitated by the geometrical factor of the crystal structure of the oxide. Use is made therefore of oxides having a crystallographic structure such as to facilitate the adaption to a layer of crystal structure having two dimensions.

In principle any oxide having the said characteristics, such as, for example, platinum oxide PtO and titanium oxide, may be used for the layer 3.

Figure 2:
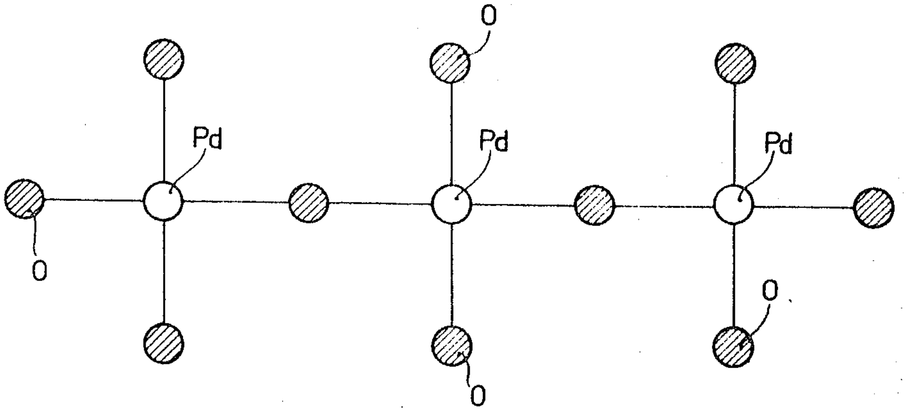
FIG. 2 shows diagrammatically the crystal structure of oxides such as advantageously used for the stable metal-oxide layer.

It has been found that especially palladium oxide PdO provides excellent results. Palladium oxide with a covalant bond has the crystal structure shown diagrammatically in FIG. 2. Each palladium atom Pd is surrounded by four oxygen atoms, each being shown, as a cross-hatched circle; this structure provides plane layers. The adaption to a surface may therefore be favourable.

Experience shows that the results obtained are favourable, the leakage currents of diodes according to the invention are very weak, the nuclear result is satisfactory, the stability with time is excellent, and especially the results obtained in high vacuum after a long period cannot be equally stable by any other means. In fact, the diodes manufactured by conventional methods can function only a few days in vacuo whereas the lifetime in vacuo of diodes according to the invention is several weeks.

The manufacture of a detector according to the invention having a layer of palladium oxide PdO will now be described by way of example. For this purpose use may be made of a silicon plate cut from a rod of N-type conductivity, the specific resistance of which depends upon the desired width of the depletion region, which rod is doped with, for example, phosphorus. The plate is carefully polished in known manner using abrasives and then etched on one side. For this purpose use is preferably made of a mixture of nitric acid, hydrofluoric acid, acetic acid, bromine and de-ionised water. This mixture etches away not only the said surface but also covers the latter with a thin uniform oxide layer.

The oxidized surface of the plate is subsequently exposed to air, at a temperature of at most approximately 100° C., for the purpose of completing the oxidation. In order to speed up the stabilization of said oxide layer, preferably a little ozone is introduced into the atmosphere surrounding the plate. The resulting inversion layer is of the p-type and constitutes, together with the n-type silicon forming the mass of the plate, the rectifying surface of the detector.

Subsequently a layer of palladium oxide is deposited, either by cathode atomization or by evaporation in vacuo, in a residual atmosphere of oxygen, by providing palladium in a cavity which is heated to 1500° C. by a tungsten filament.

A layer, designated as 3 in FIG. 1, having a thickness of a few tens angstrom and a non-stoichiometric composition is obtained the oxidation of which is completed by slightly heating at a low temperature (approximately 100° C.) in the presence of ozone.

Subsequently contacts are made to said layer by known methods.

It will be evident that modifications of the described embodiment are possible, notably by substitution of equivalent technical means, without passing beyond the scope of the invention.

What is claimed is:

1. A surface barrier radiation detector comprising a semiconductor body of one conductivity type having a superficially oxidized surface forming underneath the oxidized surface an inversion layer forming a surface barrier, a layer of a stabilizing metal oxide on said semiconductor oxide, said metal oxide having at least in part covalent bonds between its metal and oxygen atoms and a stratified crystal structure, a first electrode layer on another surface of said body, and a second electrode layer on said metal oxide layer.

2. A radiation detector as set forth in claim 1 wherein the metal oxide is palladium oxide.

3. A radiation detector as set forth in claim 2 wherein the body is a high-resistance, n-type silicon monocrystal.

References Cited

UNITED STATES PATENTS

| | | |
|---|---|---|
| 3,091,555 | 5/1963 | Smythe. |
| 3,106,489 | 10/1963 | Lepselter. |
| 3,226,612 | 12/1965 | Haenichen. |
| 3,290,175 | 12/1966 | Cusano et al. |
| 3,340,599 | 9/1967 | Webb. |
| 3,343,049 | 9/1967 | Miller et al. |

FOREIGN PATENTS

| | | |
|---|---|---|
| 1,398,830 | 4/1965 | France. |

JOHN W. HUCKERT, Primary Examiner

J. D. GRAIG, Assistant Examiner

U.S. Cl. X.R.

250—211